No. 775,913. PATENTED NOV. 29, 1904.
C. F. DIETZ.
BAKE OVEN.
APPLICATION FILED MAR. 19, 1904.
NO MODEL.

Witnesses:
John Braunwalder.
H. Benjamin.

Inventor:
Christian F. Dietz.
By
Frederick Benjamin
Atty.

No. 775,913. Patented November 29, 1904.

UNITED STATES PATENT OFFICE.

CHRISTIAN F. DIETZ, OF CHICAGO, ILLINOIS.

BAKE-OVEN.

SPECIFICATION forming part of Letters Patent No. 775,913, dated November 29, 1904.

Application filed March 19, 1904. Serial No. 198,949. (No model.)

*To all whom it may concern:*

Be it known that I, CHRISTIAN F. DIETZ, a citizen of the United States, residing at Chicago, in the county of Cook and State of Illinois, have invented certain new and useful Improvements in Bake-Ovens, of which the following is a specification.

This invention relates to improvements in bake-ovens of the class known in the art as "reel" ovens, in which the baking-pans are mounted on a revolving reel arranged in the baking-chamber.

The especial object of my improvements is to provide an oven of this class in which steam may be introduced directly into the baking-pans, where it will be held and concentrated on the products being baked. In baking "Vienna" and other brands of bread it is the practice to introduce superheated steam into the baking-chambers. On account of the large space required in which to operate a reel a considerable quantity of steam is necessary to fully occupy such space, much of which is ineffective upon the bread in the pans and is therefore wasted. I have found that by concentrating the steam in the pans and holding it in intimate contact with the bread I get much better results than with the present method above described. It is well known in the bread-baking art that by baking bread in covered pans the moisture in the dough is evaporated and converted into steam, which when superheated by the high temperature of the oven greatly facilitates the baking operation and results in an improved product. By combining the steam generated from the dough-moisture within the pan with the steam generated from without in the usual manner I am able to obtain still better results.

In carrying out my invention I utilize any form of oven suitable for a reel and construct a reel in part of pipes which communicate with a hollow shaft and with the separate pans, which are hung from the arms of the reel and are provided with removable covers.

Figure 1:
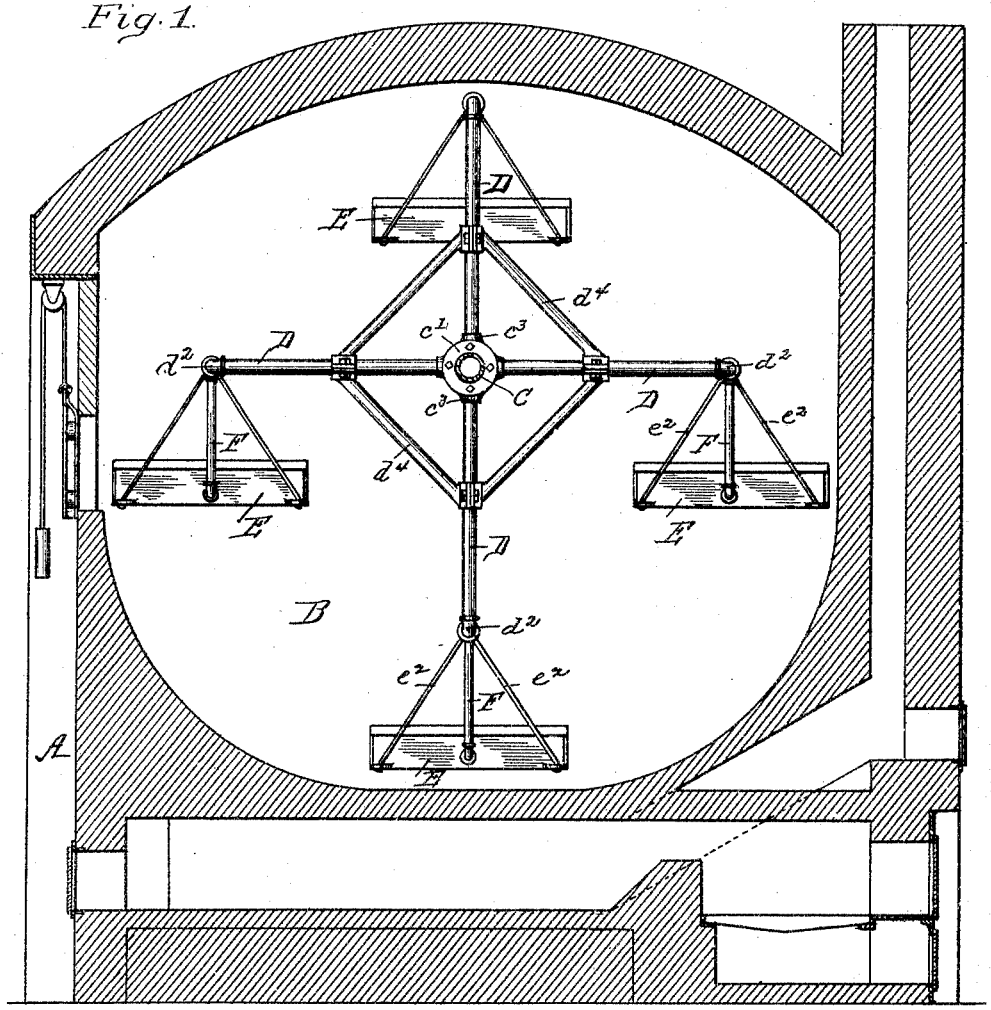
Figure 2:
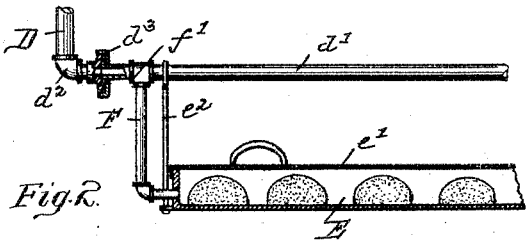
Figure 3:
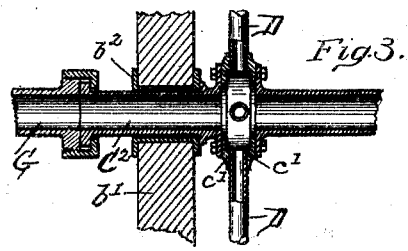

In the accompanying drawings, which form a part of this application, I have shown a preferred adaptation of my invention, as follows:

Figure 1 is a vertical section through a bake-oven equipped with my improvements in reels. Fig. 2 is a fragmentary detail, partly in section and partly in elevation, showing the method of connecting the pans with the steam-supply pipes; and Fig. 3 is a detail in section, on an enlarged scale, showing one method of coupling the hollow shaft with the radial steam-carrying pipes.

Referring to the drawings in detail, A represents a bake-oven of well-known construction and shown with a baking-chamber B simply to illustrate the application of my invention, which appertains to the reel. My improved reel is composed of radial arms D, formed from iron pipes, of a center hollow shaft C, which communicates through a coupling-box with the inner ends of the arms D and has steam introduced therein from a pipe G, the connection between the latter and the shaft being such as will permit the rotation of the shaft. It will be understood that the arms D communicate with each end of the shaft C, thus duplicating the arrangement shown in Fig. 1. Connecting the opposite pipes D and communicating therewith are horizontal pipes $d'$. To the inner ends of the pipes D are screwed elbows $d^2$, which in turn are connected with a coupling-box $d^3$, to which the ends of the horizontal pipes $d'$ are coupled in a manner permitting the turning of said last-named pipes on said boxes. The pipes $d^4$ serve as braces to connect together the radial pipes D and give rigidity to the reel. Hung from the pipes $d'$ and connected therewith by a T $f'$ is a vertical pipe F, the lower end of which is connected with the end of the baking-pan E and communicates with the interior of said pan. Through a suitable opening in the pipe $d'$ (not shown) at a point within the T there is steam communication between the pipes $d'$ and F, thus permitting the passage of steam from the pipes D to both ends of the pans E. The pans are supported in part by the pipes F and are suitably braced and supported by the rods $e^2$, which extend from the pipes $d'$ to the corners of the pans. A removable cover $e'$ is provided for each of the pans, so that the pans can be as readily used without the steam as with it.

The shaft C is connected with a short length of similar pipe, as C², by a hub formed of annular shells c', bolted together and to suitable flanges on the ends of said pipes. The hub is formed with bosses c³, into which the inner ends of the pipes D are fitted. The shaft-section C² passes through a collar or stuffing-box b², inserted in the wall b' of the oven and which serves as a bearing for the shaft, as shown in Fig. 3.

Connected with the outer end of the shaft-section C² is the steam-supply pipe C, the coupling between the parts being of any suitable form to permit the free rotation of the shaft.

The loaves are placed in the pans E, and the covers e' are fitted over the pans, thus converting the latter into approximately steam-tight receptacles. The steam being turned into the pipe G from the source of supply, it will traverse the hollow shaft and distribute itself throughout the several radial pipes D, their pipe connections d' and F, and enter the pans at their opposite ends, thus being circulated in a manner that will prevent waste and secure concentration where most needed—i. e., in the pans in contact with the products being baked. The arrangement of pipes and their connections permit the free rotation of the reel and the swinging of the pans, it being understood that the couplings need not be absolutely steam-tight, as a slight escape of steam at such points can do no harm. If it be desired to use the oven without the steam, it can be cut off by any suitable means in the pipe G, and the covers of the pan may be left off.

Having thus described my invention, what I claim as new, and desire to obtain by Letters Patent, is—

1. In a bake-oven reel, swinging pans each of said pans provided with steam connections for the purpose described.

2. In a bake-oven reel, swinging and closable pans, each of said pans provided with steam connections for the purpose described.

3. In a bake-oven reel, swinging pans adapted to be made substantially steam-tight, and means for introducing steam into such pans.

4. In a bake-oven reel, a steam-conducting shaft, pipes extending radially from said shaft and communicating therewith, covered bake-pans supported from said pipes, and means conducting steam from said radial pipes to said pans.

5. In a bake-oven reel, a rotatable steam-conducting shaft having radial pipe-arms, bake-pans swingingly supported from said arms, and pipes communicating with said arms and the interior of said pans.

In testimony whereof I affix my signature in presence of two witnesses.

CHRISTIAN F. DIETZ.

Witnesses:
 Wm. B. Moore,
 F. Benjamin.